(12) United States Patent
Cheng et al.

(10) Patent No.: US 9,235,248 B2
(45) Date of Patent: Jan. 12, 2016

(54) POWER DISTRIBUTION DEVICE AND POWER DISTRIBUTION CIRCUIT

(75) Inventors: Sheng-Hsiung Cheng, New Taipei (TW); Ting-Yu Chang, New Taipei (TW)

(73) Assignee: AOPEN, INC. (TW)

( * ) Notice: Subject to any disclaimer, the term of this patent is extended or adjusted under 35 U.S.C. 154(b) by 964 days.

(21) Appl. No.: 13/296,142

(22) Filed: Nov. 14, 2011

(65) Prior Publication Data

US 2012/0187760 A1 Jul. 26, 2012

(30) Foreign Application Priority Data

Jan. 26, 2011 (TW) .............................. 100102837 A

(51) Int. Cl.
| | |
|---|---|
| H02J 1/10 | (2006.01) |
| H02J 3/38 | (2006.01) |
| H02J 7/34 | (2006.01) |
| G06F 1/30 | (2006.01) |
| H02J 3/00 | (2006.01) |
| G06F 1/00 | (2006.01) |

(52) U.S. Cl.
CPC ... G06F 1/30 (2013.01); H02J 3/00 (2013.01); G06F 1/00 (2013.01); Y10T 307/305 (2015.04)

(58) Field of Classification Search
CPC .............. G06F 1/26; G06F 1/00; G06F 1/32; H02J 9/061; H02J 3/00; H02M 7/00; G05F 1/40; H05B 37/02; H05B 37/00
USPC .......... 307/18, 64, 23, 66, 82, 87; 363/65, 71; 315/154, 313
See application file for complete search history.

(56) References Cited

U.S. PATENT DOCUMENTS

| | | | |
|---|---|---|---|
| 5,828,140 A | 10/1998 | Shih | |
| 6,163,087 A * | 12/2000 | Huang | ...................... G06F 1/20 307/64 |
| 6,661,119 B2 | 12/2003 | Liu et al. | |

(Continued)

FOREIGN PATENT DOCUMENTS

CN          101572437          11/2009

OTHER PUBLICATIONS

CN Appln. No. 201110038740—Office Action dated Apr. 3, 2014, with abridged English translation.

*Primary Examiner* — Rexford Barnie
*Assistant Examiner* — Jagdeep Dhillon
(74) *Attorney, Agent, or Firm* — Davidson Berquist Jackson & Gowdey, LLP

(57) ABSTRACT

A power distribution device includes a number (N, N≥2) of power input terminals, a number (M, M≥2) of power output terminals, and a number (M) of power distribution circuits, each electrically coupled to a corresponding one of the power output terminals and electrically coupled to a number (P, P≥2) of the power input terminals. Each of the power distribution circuits includes a number (P) of diodes each electrically coupled between a respective one of the power input terminals and the corresponding one of the power output terminals, a switch element connected in parallel to one of the diodes, and a controller controlling the switch element to operate in a conducting state when the controller determines that power received at the power input terminal connected to the switch is normal, and controlling the switch element to operate in a non-conducting state when the power is abnormal.

10 Claims, 13 Drawing Sheets

(56) References Cited

U.S. PATENT DOCUMENTS

| | | | |
|---|---|---|---|
| 7,466,573 B2 * | 12/2008 | Kojori | H02J 1/10 323/271 |
| 8,782,449 B2 * | 7/2014 | Itakura | H02J 3/005 307/60 |
| 2008/0143188 A1 * | 6/2008 | Adest | H02J 1/102 307/82 |
| 2009/0271642 A1 | 10/2009 | Cheng et al. | |
| 2011/0084616 A1 * | 4/2011 | Negley | H05B 33/089 315/154 |

* cited by examiner

US 9,235,248 B2

POWER DISTRIBUTION DEVICE AND POWER DISTRIBUTION CIRCUIT

CROSS-REFERENCE TO RELATED APPLICATION

This application claims priority of Taiwanese Application No. 100102837, filed on Jan. 26, 2011, and the disclosures of which is incorporated herein by reference.

BACKGROUND OF THE INVENTION

1. Field of the Invention

The present invention relates to a power management device, more particularly to a power distribution device.

2. Description of the Related Art

Owing to progress of technology, desktop personal computers (PCs) have been developed so as to conform to a trend of miniaturization. Mobile chipsets have been adopted to manufacture a power-saving miniaturized personal computer, such as an All-In-One (AIO) personal computer and a mini personal computer available on the market. Since the miniaturized PC adopts the power-saving mobile chipsets, a power adapter used by notebook computers may replace an ATX power supply originally used by personal computers for supplying power. Therefore, there are manufacturers gathering a plurality of mini PCs for centralized diversification management, such as a server and a multimedia digital signage. Moreover, power usage of the miniaturized PC is usually not fully loaded. For example, assuming that a power adapter provided to a mini PC has power of 90 watts and power usage rate of the mini PC is lower than 50% most of the time, i.e., only 40 watts used, the power adapter has idle power of 50 watts. Therefore, if there are six mini PCs disposed together, the idle power thereof may reach 6×50 watts=300 watts.

Furthermore, a computer is ordinarily provided with a corresponding power supply. When the power supply breaks down, the computer may not function. Moreover, when the computer is processing important data and the power supply suddenly breaks down, the important data may be lost.

Therefore, in a condition that a plurality of power supplies are providing electricity at the same time, how to provide power to other computers or electronic devices in urgent need using idle power of the power supplies is the subject of the present invention.

SUMMARY OF THE INVENTION

Therefore, an object of the present invention is to provide a power distribution device capable of distributing power in a timely manner so as to optimize a power usage rate.

For achieving the object mentioned above, a power distribution device of the present invention comprises a number (N) of power input terminals each to be electrically coupled to a corresponding power supply, a number (M) of power output terminals each to be electrically coupled to a corresponding electronic device so as to output power thereto, and a number (M) of power distribution circuits, each electrically coupled to a corresponding one of the power output terminals and electrically coupled to a number (P) of the power input terminals. Each of the numbers N, M, and P is independently a positive integer not less than 2. Each of the power distribution circuits includes a number (P) of first diodes, a switch element and a controller.

Each of the first diodes is electrically coupled in a forward-bias arrangement between a respective one of the power input terminals and the corresponding one of the power output terminals. The switch element is connected in parallel to one of the first diodes and is electrically coupled to one of the power input terminals that is electrically coupled to said one of the first diodes. The controller is electrically coupled to the switch element and said one of the power input terminals that is electrically coupled to the switch element. The controller controls the switch element to operate in a conducting state such that said one of the power input terminals that is electrically coupled to the switch element is electrically coupled to the corresponding one of the power output terminals through the switch element when the controller determines that power received at said one of the power input terminals that is electrically coupled to the switch element is normal. The controller controls the switch element to operate in a non-conducting state when the controller determines that the power received at said one of the power input terminals that is electrically coupled to the switch element is abnormal.

Each of the power distribution circuits further includes a first indicator electrically coupled to the controller, a second indicator electrically coupled to the controller, a first OR gate electrically coupled to the controller, a connector electrically coupled to the first OR gate, and a jumper electrically coupled to the first OR gate. When the connector is electrically coupled to the corresponding electronic device through the corresponding one of the power output terminals so as to output a signal to the first OR gate or when the jumper is configured to output a signal to the first OR gate, the first OR gate outputs a first signal to the controller, and the controller is responsive to the first signal so as to activate the first indicator when the controller determines that the power received at said one of the power input terminals that is electrically coupled to the switch element is normal, and so as to activate the second indicator when the controller determines that the power received at said one of the power input terminals that is electrically coupled to the switch element is abnormal.

At least one of the power distribution circuits further includes a first voltage converter electrically coupled between the first diodes of the power distribution circuit and the corresponding one of the power output terminals for generating a converted voltage by converting voltage received at one of the power input terminals that is electrically coupled to the power distribution circuit and outputting the converted voltage to the corresponding one of the power output terminals.

The switch element is one of a metal-oxide-semiconductor field-effect transistor (MOSFET) and a relay.

The power distribution device further comprises a second voltage converter, a number (N) of second diodes, a second power output terminal and a setting unit. Each of the second diodes is electrically coupled between a respective one of the power input terminals and the second voltage converter. The setting unit is electrically coupled to the second voltage converter and is operable to set an output voltage of the second voltage converter. The second voltage converter generates the output voltage by converting voltage received at one of the power input terminals according to setting of the setting unit and outputs the output voltage to the second power output terminal.

The power distribution device further comprises
a second OR gate electrically coupled to the first OR gates of the power distribution circuits, a third voltage converter electrically coupled to the second OR gate, a number (N) of third diodes each electrically coupled between a respective one of the power input terminals and the third voltage converter, and a plurality of fan connectors each electrically coupled to the third voltage converter for electrical coupling with a heat-dissipating fan. When the second OR gate receives the first signal from at least one of the first OR gates, the second OR gate outputs a second signal to the third voltage converter, and the third voltage converter responds to the second signal by generating fan voltages through converting voltage received at one of the power input terminals and by outputting the fan voltages to the fan connectors, respectively.

Moreover, another object of the present invention is to provide a power distribution circuit. The power distribution circuit of the present invention is to be electrically coupled to a first power supply and a second power supply so as to provide power to an electronic device which is to be electrically coupled to the power distribution circuit. The power distribution circuit comprises a first diode, a second diode, a switch element and a controller.

The first diode is to be electrically coupled in a forward-bias arrangement between the first power supply and the electronic device. The second diode is to be electrically coupled in a forward-bias arrangement between the second power supply and the electronic device. The switch element is connected in parallel to the first diode. The controller is to be electrically coupled to the first power supply and is electrically coupled to the switch element. The controller controls the switch element to operate in a conducting state such that the first power supply is electrically coupled to the electronic device through the switch element when the controller determines that the first power supply operates normally. The controller controls the switch element to operate in a non-conducting state when the controller determines that the first power supply operates abnormally.

The power distribution circuit further comprises a first indicator electrically coupled to the controller, a second indicator electrically coupled to the controller, an OR gate electrically coupled to the controller, a connector electrically coupled to the OR gate, and a jumper electrically coupled to the OR gate. When the electronic device is electrically coupled to the connector and outputs a signal to the OR gate or when the jumper is configured to output a signal to the OR gate, the OR gate outputs a first signal to the controller, and the controller is responsive to the first signal so as to activate the first indicator when the controller determines that the first power supply operates normally and so as to activate the second indicator when the controller determines that the first power supply operates abnormally.

The power distribution circuit further comprises a first power input terminal to be electrically coupled between the first power supply and the first diode, a second power input terminal to be electrically coupled between the second power supply and the second diode, and a power output terminal to be electrically coupled between the first and second diodes and the electronic device.

The switch element is one of a metal-oxide-semiconductor field-effect transistor (MOSFET) and a relay.

In the present invention, the first power supply to be electrically coupled to the power distribution device serves as a primary power source, and the second power supply to be electrically coupled to the power distribution device serves as a backup power source. By means of a determination made by the controller as to whether the first power supply operates normally, the first power supply provides electricity to the electronic device that is electrically coupled thereto when a result of the determination made by the controller is affirmative. Otherwise, the second power supply provides electricity to the electronic device that is electrically coupled thereto when the result of the determination made by the controller is negative. In this way, by means of providing power to the electronic device in urgent need using idle or extra power of the other power supplies, objects of sharing power resources effectively, raising power usage rate, and that the electronic device electrically coupled to the power output terminal may not be interrupted from receiving power are positively achieved.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE PREFERRED EMBODIMENTS

Figure 1:
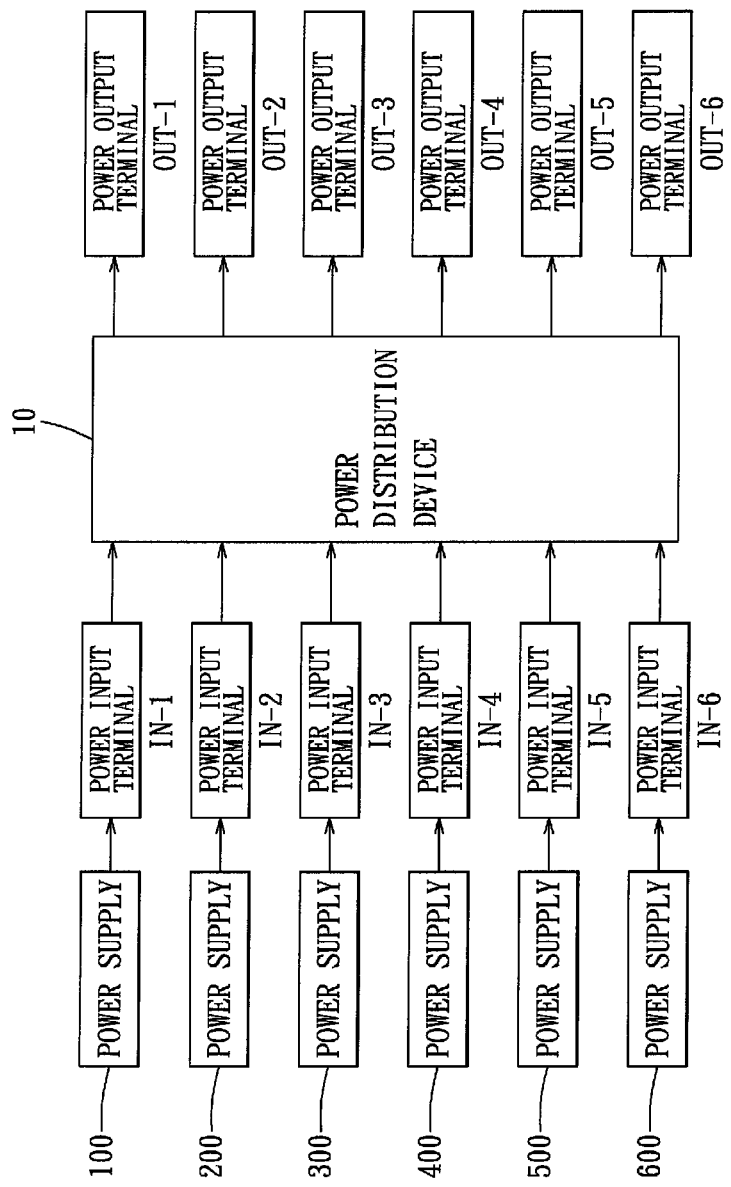
FIG. 1 is a block diagram illustrating a first embodiment of the power distribution device of the present invention wherein power input terminals and power output terminals are shown.

Before the present invention is described in greater detail with reference to the embodiments, it should be noted that the same reference numerals are used to denote the same elements throughout the following description.

Referring to FIG. 1 to FIG. 3g, a first embodiment of a power distribution device 10 of the present invention includes a number (N, in which N is a positive integer not less than 2) of power input terminals each to be electrically coupled to a corresponding power supply, and a number (M, in which N is a positive integer not less than 2) of power output terminals each to be electrically coupled to a corresponding electronic device so as to output power thereto. In this embodiment, with reference to a casing back panel 11 of the power distribution device 10 illustrated in FIG. 2, it is given as an example that six (i.e., N=6, and first to sixth) power input terminals IN-1~IN-6 and six (i.e., M=6) power output terminals OUT-1~OUT-6 are provided for the power distribution device 10, but numbers thereof are not limited to the disclosure herein. Therefore, each of the power input terminals IN-1~IN-6 is to be electrically coupled to a respective one of six power supplies 100, 200, 300, 400, 500 and 600. In this embodiment, it is given as an example that each of the power supplies 100, 200, . . . , 600 outputs the same voltage.

Referring to FIGS. 3a to 3g, the power distribution device 10 includes six (i.e., M=6) power distribution circuits 31~36, each electrically coupled to a corresponding one of the power output terminals OUT-1~OUT-6 and electrically coupled to a number (P, in which P is a positive integer not less than 2) of the power input terminals IN-1~IN-6, with the power input terminals IN-1~IN-6 being electrically coupled to the power distribution circuits 31~36 evenly. In this embodiment, it is given as an example that each of the power distribution circuits 31~36 is electrically coupled to four (i.e., P=4) of the power input terminals IN-1~IN-6 so as to achieve optimization of power distribution, but the invention is not limited to the disclosure herein.

Therefore, as shown in FIGS. 3a to 3g, distribution states of electrical coupling between the power distribution circuit 31~36 and the power input terminals IN-1~IN-6 are illustrated hereinafter:

The power distribution circuit 31 is electrically coupled to the first, second, fourth and fifth power input terminals IN-1, IN-2, IN-4 and IN-5.

The power distribution circuit 32 is electrically coupled to the first, second, fourth and fifth power input terminals IN-1, IN-2, IN-4 and IN-5.

The power distribution circuit 33 is electrically coupled to the first, third, fourth and sixth power input terminals IN-1, IN-3, IN-4 and IN-6.

The power distribution circuit 34 is electrically coupled to the first, third, fourth and sixth power input terminals IN-1, IN-3, IN-4 and IN-6.

The power distribution circuit 35 is electrically coupled to the second, third, fifth and sixth power input terminals IN-2, IN-3, IN-5 and IN-6.

The power distribution circuit 36 is electrically coupled to the second, third, fifth and sixth power input terminals IN-2, IN-3, IN-5 and IN-6.

Referring to FIGS. 3a to 3g, each of the power distribution circuits 31 to 36 includes a number (P, and P=4) of first diodes D1~D4, a switch element Q1 and a controller 37.

Each of the first diodes D1~D4 of the power distribution circuit 31 is electrically coupled in a forward-biased arrangement between a respective one of the power input terminals IN-1, IN-2, IN-4 and IN-5 and the power output terminal OUT-1. The switch element Q1 is connected in parallel to the first diode D1 and is electrically coupled to the power input terminal IN-1 that is electrically coupled to the first diode D1. The controller 37 is electrically coupled to the switch element Q1 and the power input terminal IN-1 that is electrically coupled to the switch element Q1. While a MOS transistor is provided as an example of the switch element Q1 in this embodiment, the present invention is not limited to the disclosure herein. That is, the switch element Q1 may be any element whose impedance in a conducting state is smaller than impedance of the first diode D1 in a conducting state, such as a relay or other elements having the same property.

Each of the power input terminals IN-1, IN-2, IN-4 and IN-5 is electrically coupled to a respective one of four of the power supplies 100, 200, 400 and 500. In which, the power supply 100 that is electrically coupled to the power input terminal IN-1 is a primary power source, and each of the power supplies 200, 400 and 500 that is electrically coupled to a respective one of the power input terminals IN-2, IN-4 and IN-5 is a backup power source.

The controller 37 is configured to determine whether power received at the power input terminal IN-1 that is electrically coupled to the switch element Q1 (i.e., electrically coupled to the first diode D1) is normal, that is, whether the power supply 100 that is electrically coupled to the power input terminal IN-1 operates normally. For example, whether voltage outputted from the power supply 100 is maintained at a normal value. When a result of the determination made by the controller 37 is affirmative, the controller 37 controls the switch element Q1 to operate in a conducting state. At this moment, since the impedance of the switch element Q1 in the conducting state is smaller than each of impedances of a respective one of the first diodes D1~D4, current outputted from the power supply 100 chooses a path via the switch element Q1 to the power output terminal OUT-1 such that each of N-node voltages of a respective one of the first diodes D1~D4 is greater than each of P-node voltages thereof (i.e., voltages at the power input terminals IN-1, IN-2, IN-4 and IN-5) so that the first diodes D1~D4 operate in a non-conducting state. Therefore, when the power supply 100 operates normally, the power distribution circuit 31 is configured to use the power supply 100 as the primary power source.

On the contrary, when the controller 37 determines that the power received at the power input terminal IN-1 is abnormal, i.e., determines that the voltage outputted from the power supply 100 that is electrically coupled to the power input terminal IN-1 is lower than the normal value, the controller 37 determines that the power supply 100 malfunctions or is disconnected from the power input terminal IN-1 and controls the switch element Q1 to operate in a non-conducting state. At this moment, since the voltage of the power supply 100 is lower than the voltages of the power supplies 200, 400 and 500 that operate normally, one of the power supplies 200, 400 and 500 that outputs a higher voltage may enable the first diode D2~D4 that is electrically coupled thereto to operate in a conducting state so as to replace the power outputted from the power supply 100 to the power output terminal OUT-1.

Therefore, when the primary power supply 100 malfunctions or is disconnected from the power input terminal IN-1, one of the other power supplies 200, 400 and 500 that has more remaining power may provide power to the power output terminal OUT-1 in a timely manner so as to prevent the electronic device which receives power at the power output terminal OUT-1 from malfunctioning or losing important data during data processing resulting from insufficient power supply or power interruption.

Similarly, the power distribution circuit 32 is electrically coupled to each of the power input terminals IN-1, IN-2, IN-4 and IN-5 via a respective one of the first diodes D2, D1, D3 and D4, and the power output terminal OUT-2. The power supply 200 electrically coupled to the power input terminal IN-2 is the primary power source, each of the power supplies 100, 400 and 500 that is electrically coupled to a respective one of the power input terminals IN-1, IN-4 and IN-5 is the backup power source, and the switch element Q1 is connected in parallel to the first diode D1. When the controller 37 determines that the power supply 200 operates normally, the power supply 200 outputs power via the switch element Q1 to the power output terminal OUT-2. Otherwise, the controller 37 controls the switch element Q1 to operate in the non-conducting state, such that one of the other power supplies 100, 400 and 500 that has more remaining power (i.e., the one having a higher voltage) may provide power to the power output terminal OUT-2.

Similarly, the power distribution circuit 33 is electrically coupled to each of the power input terminals IN-1, IN-3, IN-4 and IN-6 via a respective one of the first diodes D2, D1, D4 and D3, and the power output terminal OUT-3. The power supply 300 electrically coupled to the power input terminal IN-3 is the primary power source, each of the power supplies 100, 400 and 600 that is electrically coupled to a respective one of the power input terminals IN-1, IN-4 and IN-6 is the backup power source, and the switch element Q1 is connected in parallel to the first diode D1. When the controller 37 determines that the power supply 300 operates normally, the power supply 300 outputs power via the switch element Q1 to the power output terminal OUT-3. Otherwise, the controller 37 controls the switch element Q1 to operate in the non-conducting state, such that one of the other power supplies 100, 400 and 600 that has more remaining power (i.e., the one having a higher voltage) may provide power to the power output terminal OUT-3.

Similarly, the power distribution circuit 34 is electrically coupled to each of the power input terminals IN-1, IN-3, IN-4 and IN-6 via a respective one of the first diodes D3, D2, D1 and D4, and the power output terminal OUT-4. The power supply 400 electrically coupled to the power input terminal IN-4 is the primary power source, each of the power supplies 100, 300 and 600 that is electrically coupled to a respective one of the power input terminals IN-1, IN-3 and IN-6 is the backup power source, and the switch element Q1 is connected in parallel to the first diode D1. When the controller 37 determines that the power supply 400 operates normally, the power supply 400 outputs power via the switch element Q1 to the power output terminal OUT-4. Otherwise, the controller 37 controls the switch element Q1 to operate in the non-conducting state, such that one of the other power supplies 100, 300 and 600 that has more remaining power (i.e., the one having a higher voltage) may provide power to the power output terminal OUT-4.

Similarly, the power distribution circuit 35 is electrically coupled to each of the power input terminals IN-2, IN-3, IN-5 and IN-6 via a respective one of the first diodes D3, D2, D1 and D4, and the power output terminal OUT-5. The power supply 500 electrically coupled to the power input terminal IN-5 is the primary power source, each of the power supplies 200, 300 and 600 that is electrically coupled to a respective one of the power input terminals IN-2, IN-3 and IN-6 is the backup power source, and the switch element Q1 is connected in parallel to the first diode D1. When the controller 37 determines that the power supply 500 operates normally, the power supply 500 outputs power via the switch element Q1 to the power output terminal OUT-5. Otherwise, the controller 37 controls the switch element Q1 to operate in the non-conducting state, such that one of the other power supplies 200, 300 and 600 that has more remaining power (i.e., the one having a higher voltage) may provide power to the power output terminal OUT-5.

Similarly, the power distribution circuit 36 is electrically coupled to each of the power input terminals IN-2, IN-3, IN-5 and IN-6 via a respective one of the first diodes D4, D3, D2 and D1, and the power output terminal OUT-6. The power supply 600 electrically coupled to the power input terminal IN-6 is the primary power source, each of the power supplies 200, 300 and 500 that is electrically coupled to a respective one of the power input terminals IN-2, IN-3 and IN-5 is the backup power source, and the switch element Q1 is connected in parallel to the first diode D1. When the controller 37 determines that the power supply 600 operates normally, the power supply 600 outputs power via the switch element Q1 to the power output terminal OUT-6. Otherwise, the controller 37 controls the switch element Q1 to operate in the non-conducting state, such that one of the other power supplies 200, 300 and 500 that has more remaining power (i.e., the one having higher voltage) may provide power to the power output terminal OUT-6.

It is apparent from above that each of the six power supplies 100, 200, . . . , 600 that inputs power to the power distribution device 10 is evenly distributed to the six power output terminals OUT-1~OUT-6, such that each of the power output terminals OUT-1~OUT-6 is electrically coupled to the respective primary power source and the respective three backup power sources among the power supplies 100, 200, . . . , 600. When the respective primary power source of the power output terminals OUT-1~OUT-6 operates normally, each of the power output terminals OUT-1~OUT-6 is configured to output electricity of the primary power source to the electronic device electrically coupled thereto. When the respective primary power source of the power output terminals OUT-1~OUT-6 operates abnormally, each of the other backup power sources that is electrically coupled to a respective one of the power output terminals OUT-1~OUT-6 may output backup electricity to the electronic device electrically coupled thereto. In this way, by means of providing power to the electronic device in urgent need using idle or extra power of the other power supplies, objects of sharing power resources effectively, raising power usage rate, and that the electronic device electrically coupled to one of the power output terminals OUT-1~OUT-6 may not be interrupted from receiving power are positively achieved.

Figure 4:
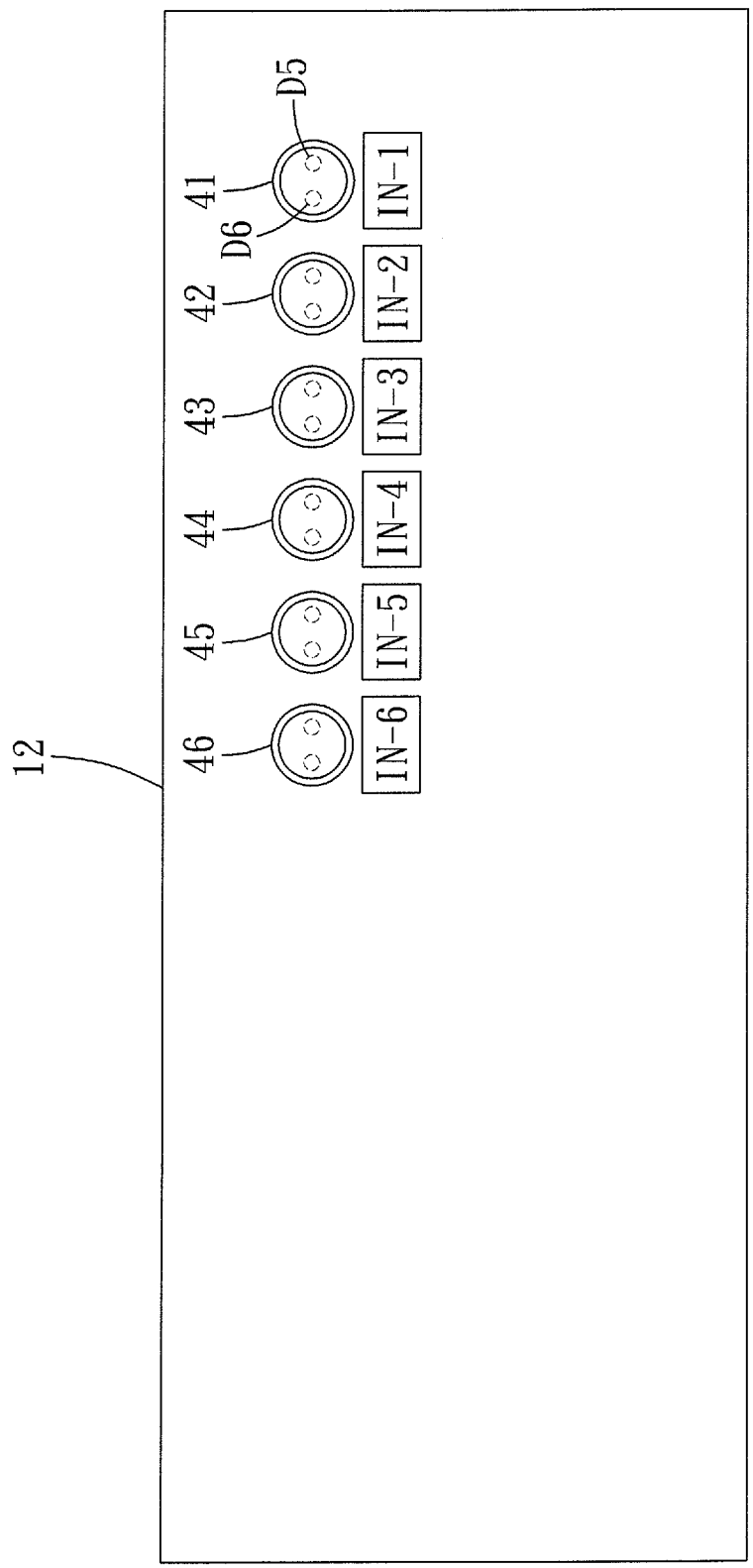
FIG. 4 is a schematic view illustrating a casing front panel of the first embodiment of the power distribution device.

Moreover, for a purpose that a user may be aware of usage states of the power supplies, referring to FIGS. 3a to 3g, each of the power distribution circuits 31~36 further includes a first indicator D5 electrically coupled to the controller 37, a second indicator D6 electrically coupled to the controller 37, a first OR gate 39 electrically coupled to the controller 37, a connector 41 electrically coupled to the first OR gate 39, and a jumper 42 electrically coupled to the first OR gate 39. Furthermore, referring to FIG. 2, each connector 41 is a respective one of USB connectors USB1~USB6 disposed on the casing back panel 11 of the power distribution device 10. With reference to a casing front panel 12 of the power distribution device 10 illustrated in FIG. 4, the first indicator D5 and the second indicator D6 of each of the power distribution circuits 31~36 are a green light-emitting diode (LED) and a red LED, both disposed in a respective lamp cover 41, 42, . . . , 46 on the casing front panel 12. In addition, the first indicator D5 and the second indicator D6 may be replaced by a dual color LED capable of emitting green light and red light.

The power distribution circuit 31 is taken as an example in the following description. The connector 41 in this embodiment is the USB connector, and is to be electrically coupled to a USB connector of the electronic device that is electrically coupled to the power output terminal OUT-1 for outputting a signal, such as a high-level signal, to the first OR gate 39. The jumper 42 is a user-operable mechanical switch. When the electronic device that is electrically coupled to the power output terminal OUT-1 is not a computer peripheral having active USB connectors, such as a LAN Hub or a KVM device (keyboard, video and mouse), the jumper 42 is configured to operate in a conducting state by the user's operation so as to output a signal, such as a high-level signal, to the first OR gate 39. On the contrary, when the power output terminal OUT-1 is not electrically coupled to the electronic device, the jumper 42 is configured to operate in a non-conducting state by the user's operation so as to output a low-level signal to the first OR gate 39. Therefore, when the first OR gate receives the high-level signal, it means that the power output terminal OUT-1 is electrically coupled to an electronic device and the first OR gate 39 outputs a first signal En_LED1, such as a high-level signal, to the controller 37. At this moment, when the controller 37 receives the high-level signal and determines that the power supply 100 operates normally, the controller 37 activates the first indicator D5 to emit green light. On the contrary, when the controller 37 determines that the power supply 100 operates abnormally, regardless of whether the high-level signal outputted from the first OR gate 39 is received or not, the controller 37 activates the second indicator D6 to emit red light so as to inform the user to check or replace the power supply 100. Furthermore, when the first OR gate 39 receives the low-level signal, the first OR gate 39 outputs another low-level signal to the controller 37 and the controller 37 may not activate the first indictor D5 and the second indicator D6 such that the user may become aware that the power output terminal OUT-1 is not electrically coupled to the electronic device.

Referring once again to FIGS. 3a to 3g, each of the power distribution circuits 31~36 further includes a first voltage converter 38 electrically coupled between the first diodes D1~D4 of the power distribution circuit and the corresponding one of the power output terminals OUT-1~OUT-6. Before the voltage at one of the power input terminals IN-1~IN-6 is outputted to the corresponding one of the power output terminals OUT-1~OUT-6, the first voltage converter 38 generates a converted voltage by converting the voltage and provides the converted voltage to the electronic device that is electrically coupled to the corresponding one of the power output terminals OUT1~OUT-6.

Figure 2:
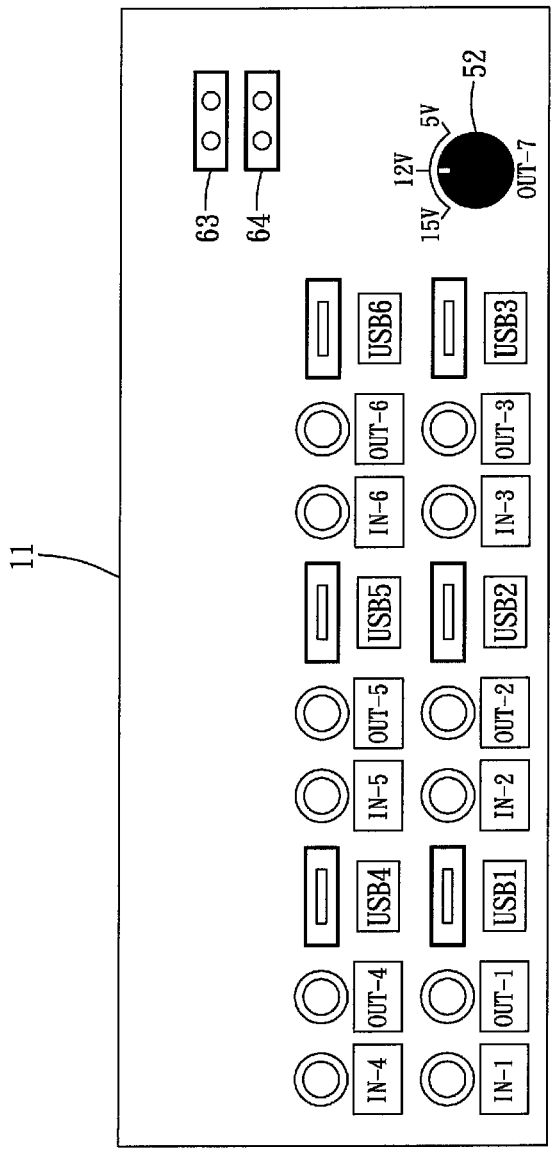
FIG. 2 is a schematic view illustrating a casing back panel of the first embodiment of the power distribution device.
Figure 3A:
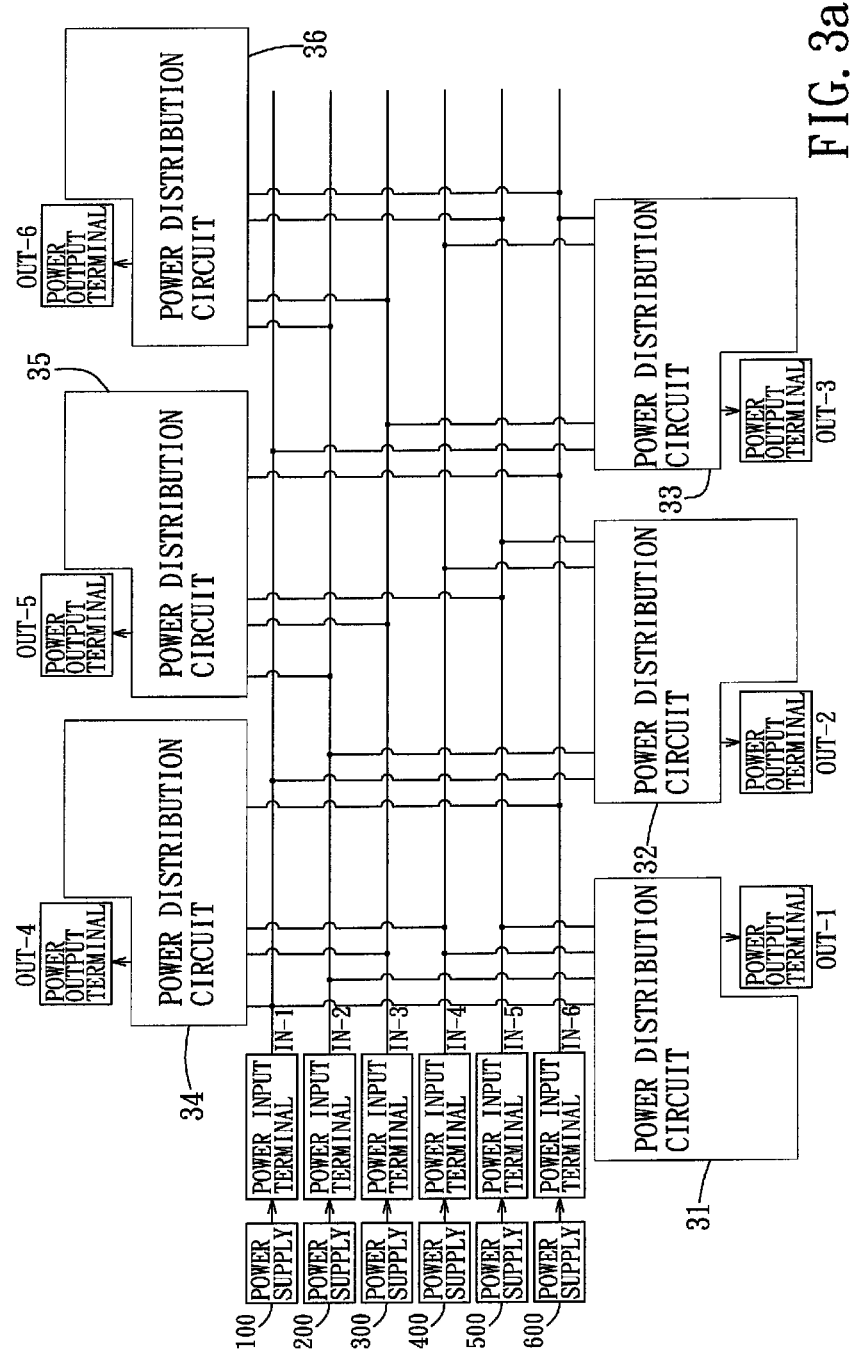
FIG. 3a is a circuit diagram of the first embodiment of the power distribution device, and each of FIGS. 3b to 3g is a circuit diagram of a respective one of power distribution circuits of the first embodiment.
Figure 3B:
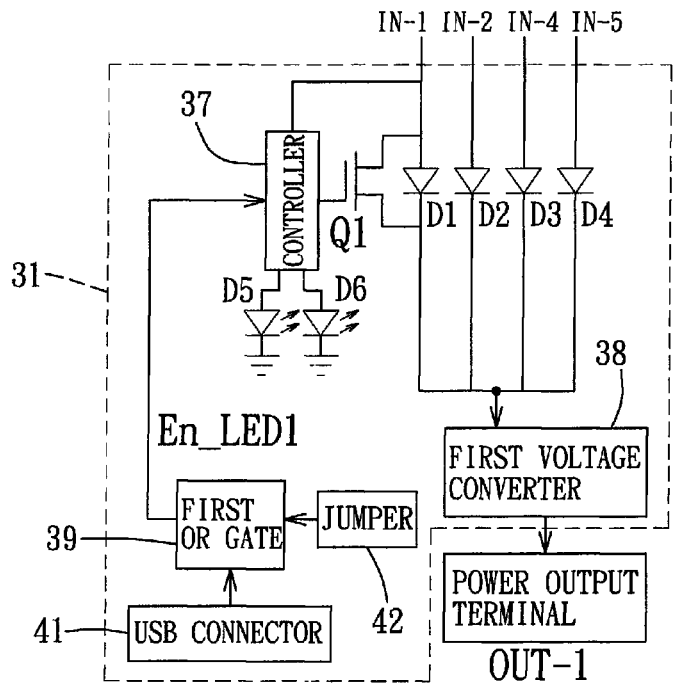
Figure 3C:
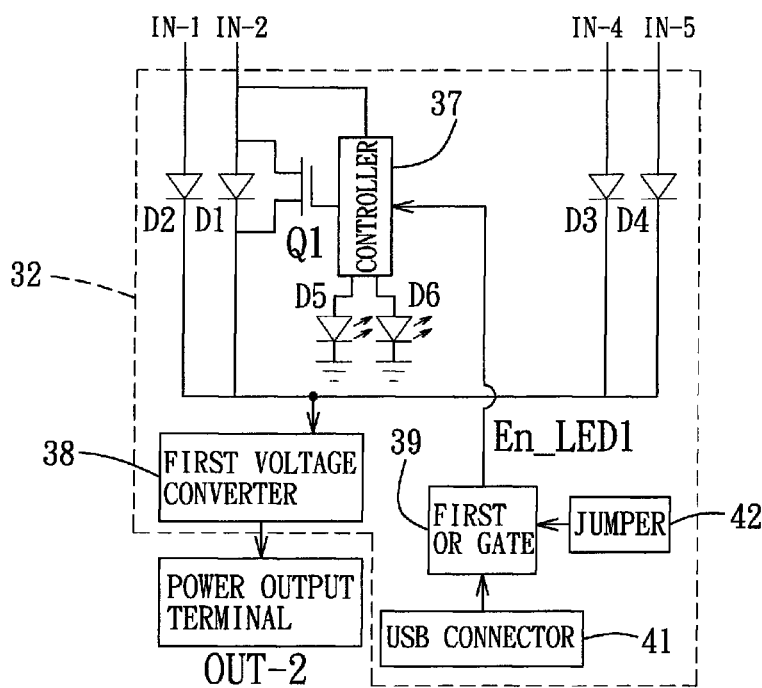
Figure 3D:
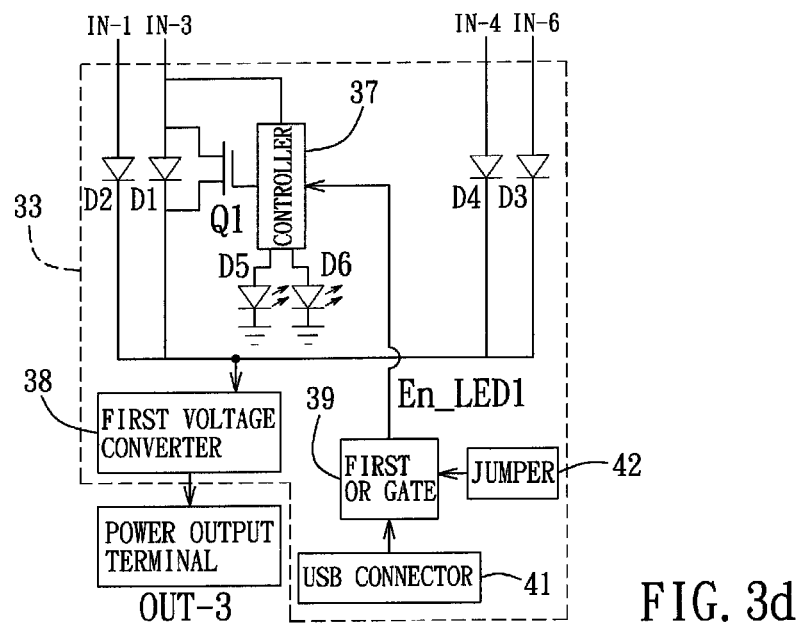
Figure 3E:
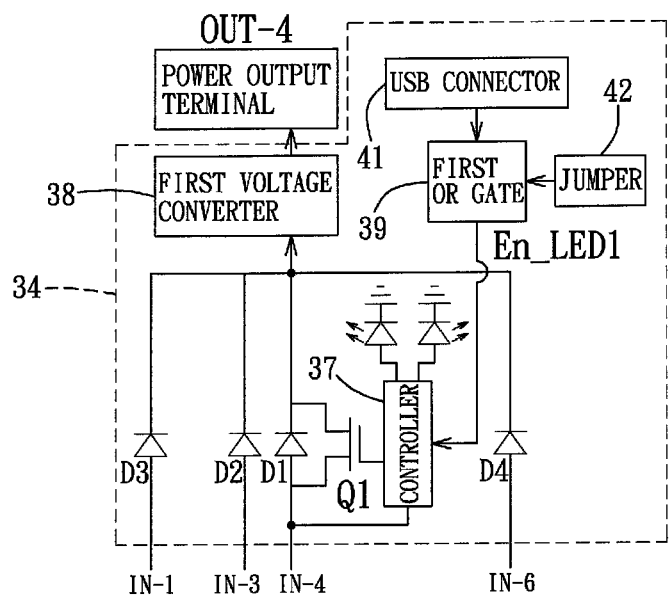
Figure 3F:
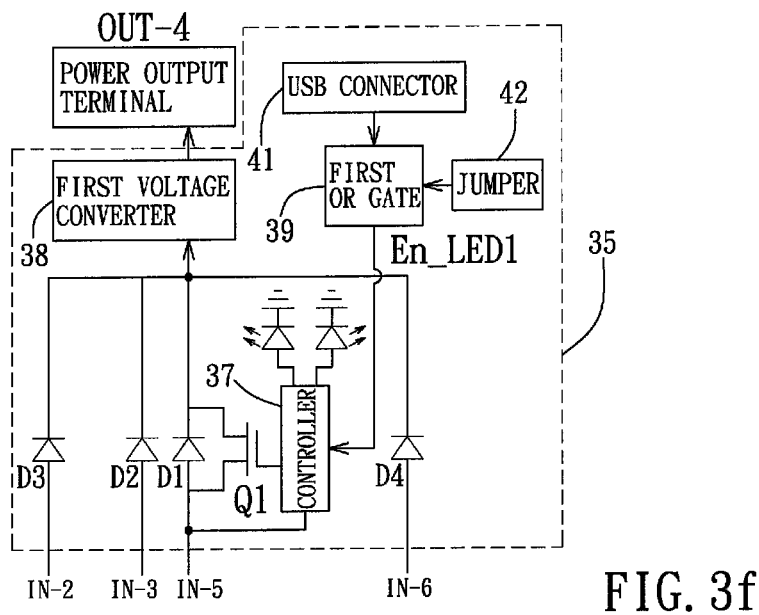
Figure 3G:
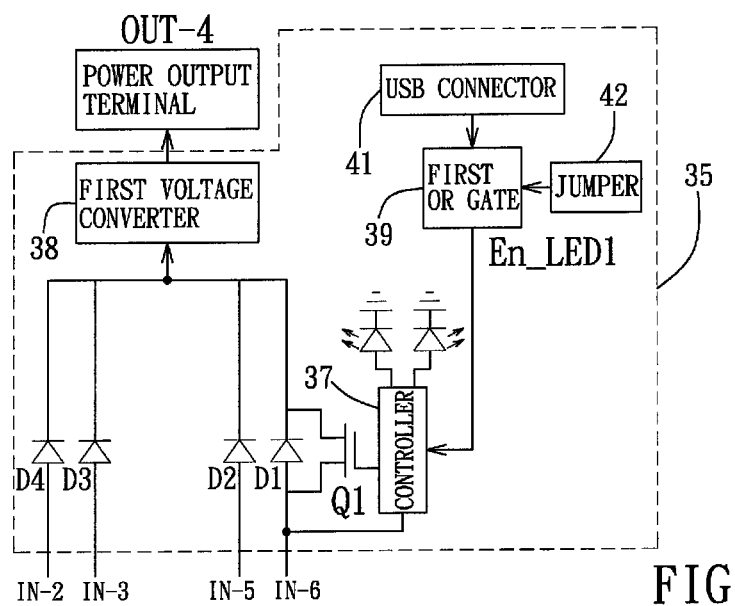
Figure 5:
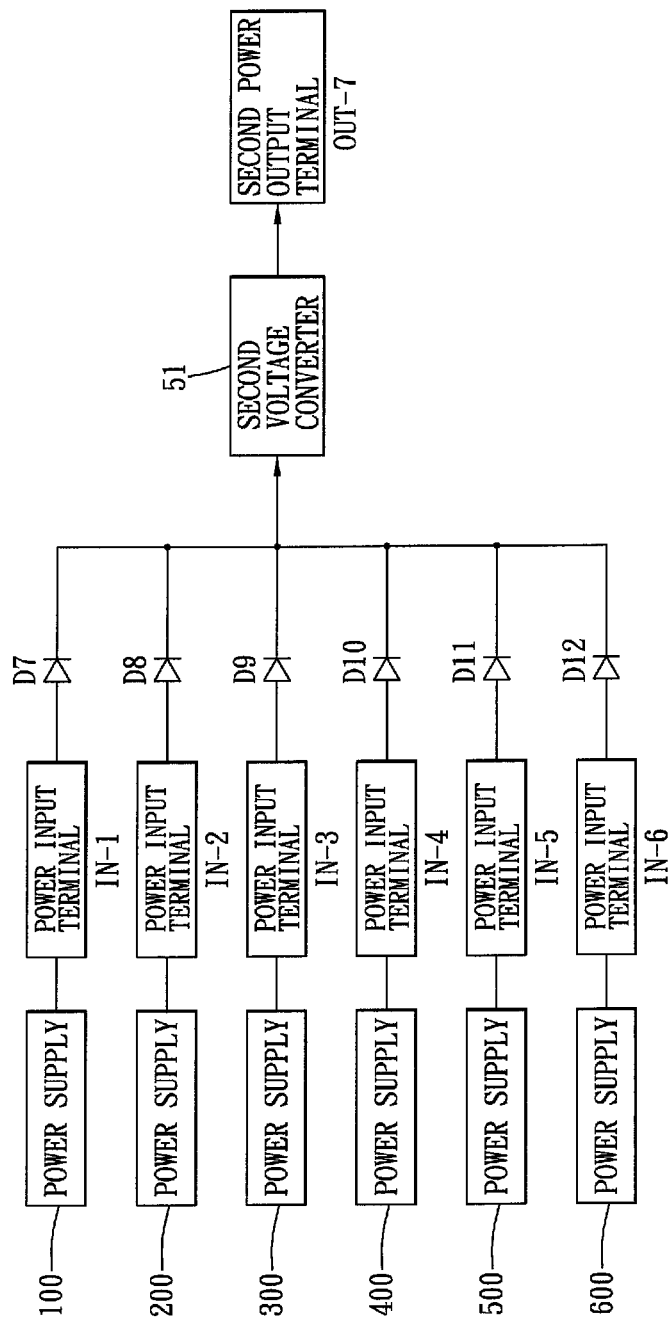
FIG. 5 is a partial circuit diagram of the first embodiment of the power distribution device.

Referring to FIG. 5 and FIG. 2, the power distribution device 10 further includes a second voltage converter 51, a number (N, N=6) of second diodes D7~D12, a second power output terminal OUT-7, and a setting unit 52 such as a control knob. Each of the second diodes D7~D12 is electrically coupled between a respective one of the power input terminals IN-1~IN-6 and the second voltage converter 51, and the second voltage converter 51 is electrically coupled between the second diodes D7~D12 and the second power output terminal OUT-7. The setting unit 52 is electrically coupled to the second voltage converter 51 and is operable to set an output voltage of the second voltage converter 51. The second voltage converter 51 generates the output voltage by converting voltage received at one of the power input terminals IN-1~IN-6 according to setting of the setting unit 52, and outputs the output voltage to the second power output terminal OUT-7. For example, when the setting unit 52 is operated at a 15V scale, the second voltage converter 51 generates the 15V output voltage by converting the voltage received at one of the power input terminals IN-1~IN-6 and outputs the 15V output voltage to the second power output terminal OUT-7. When the setting unit 52 is operated at a 12V scale, the second voltage converter 51 generates the 12V output voltage by converting the voltage received at one of the power input terminals IN-1~IN-6 and outputs the 12V output voltage to the second power output terminal OUT-7, such that the user may flexibly choose the desired output voltage.

Figure 6:
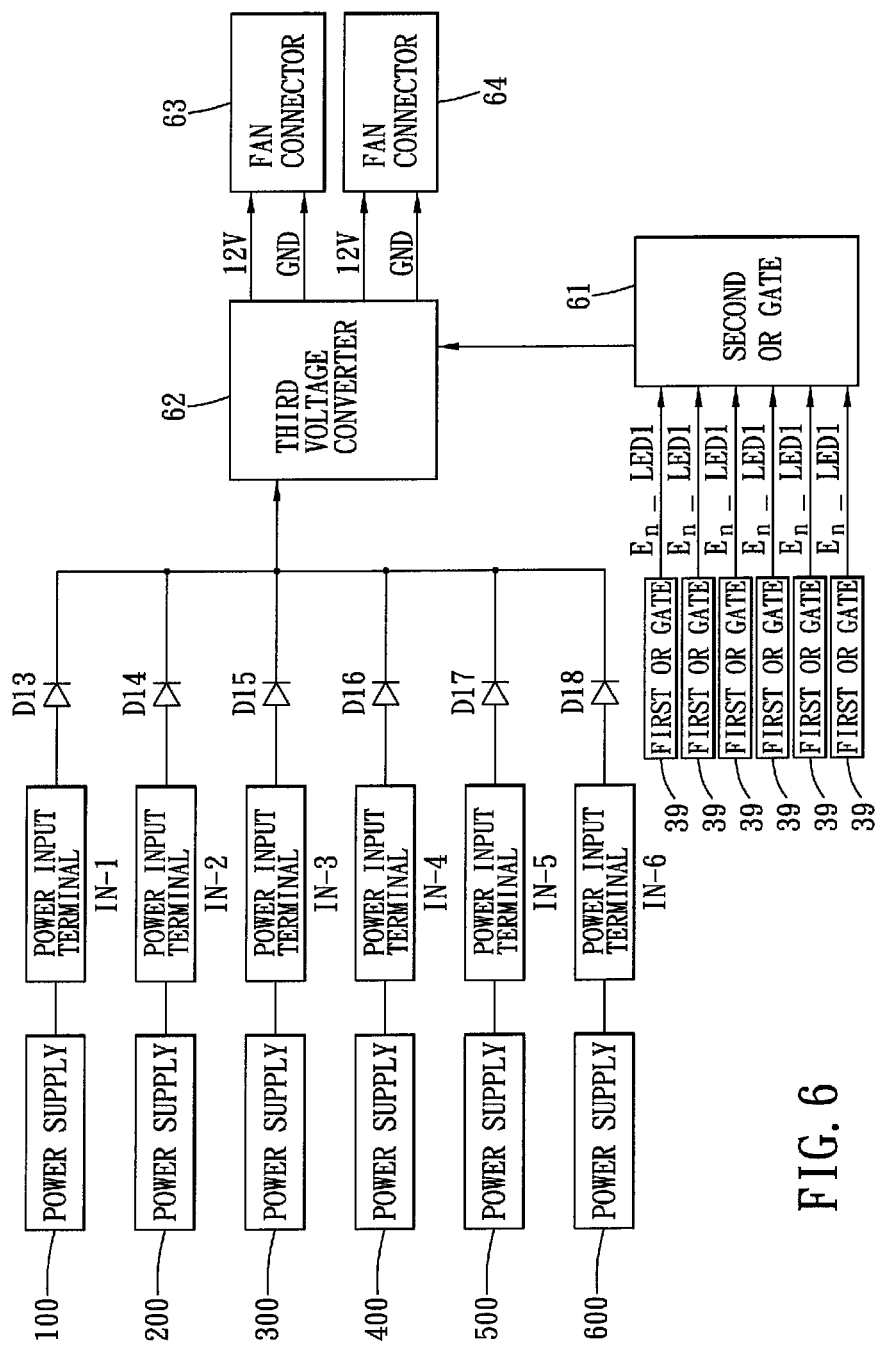
FIG. 6 is another partial circuit diagram of the first embodiment of the power distribution device.
Figure 7A:
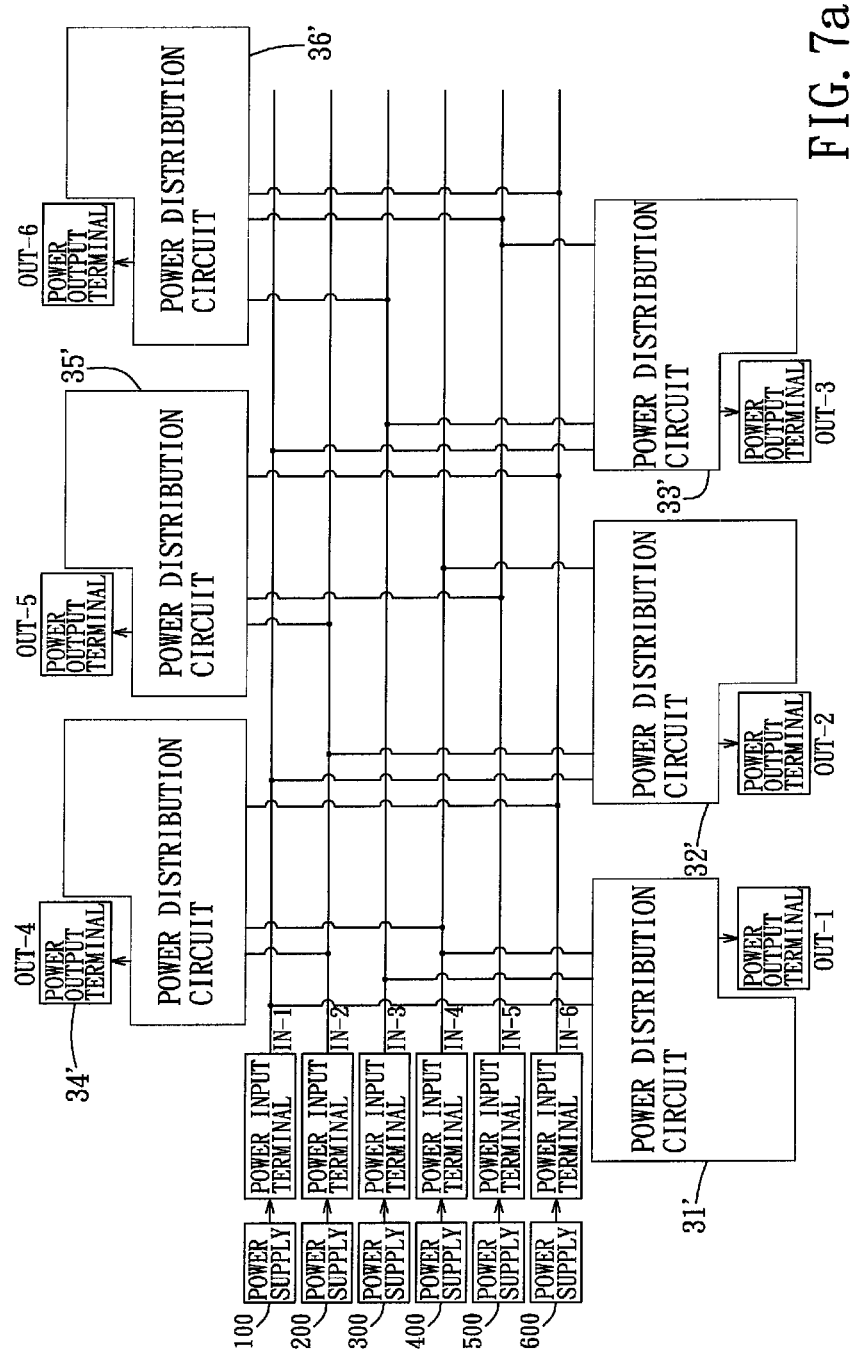
FIG. 7a is a circuit diagram of a second embodiment of the power distribution device of the present invention, and each of FIGS. 7b to 7g is a circuit diagram of a respective one of power distribution circuits of the second embodiment.
Figure 7B:
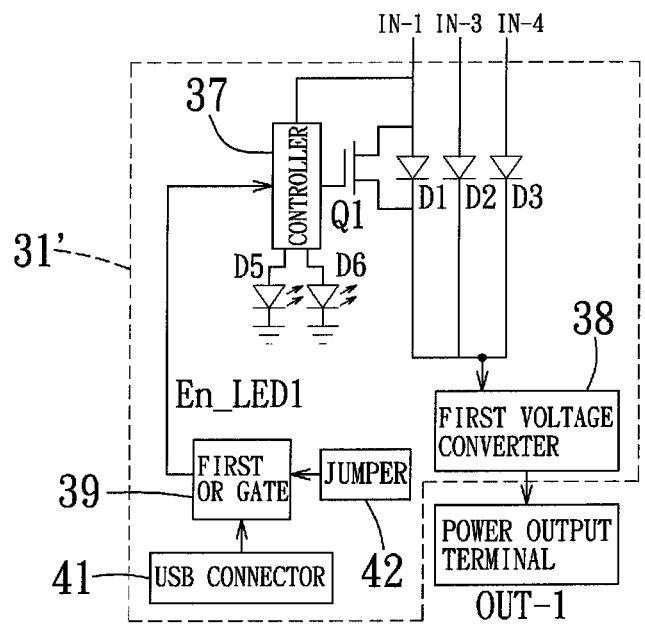
Figure 7C:
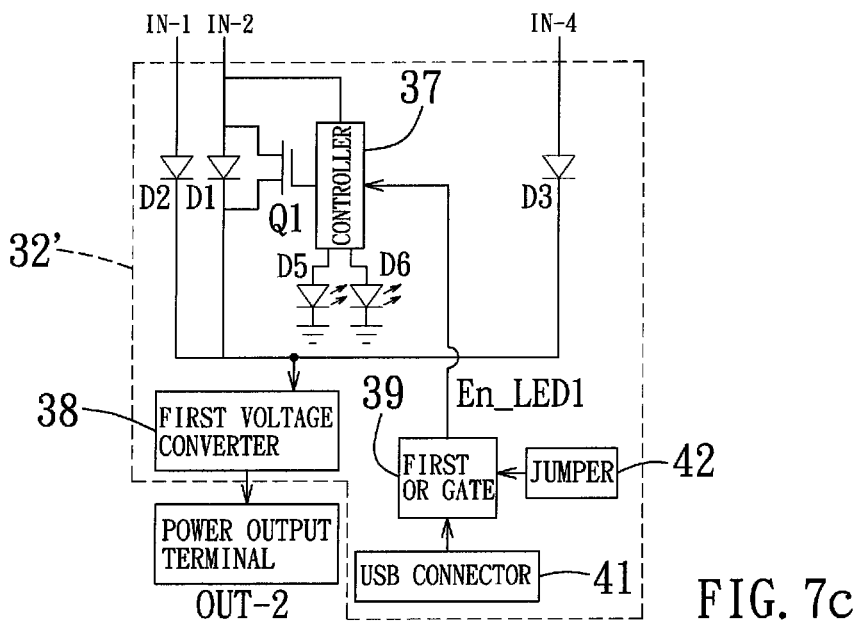
Figure 7D:
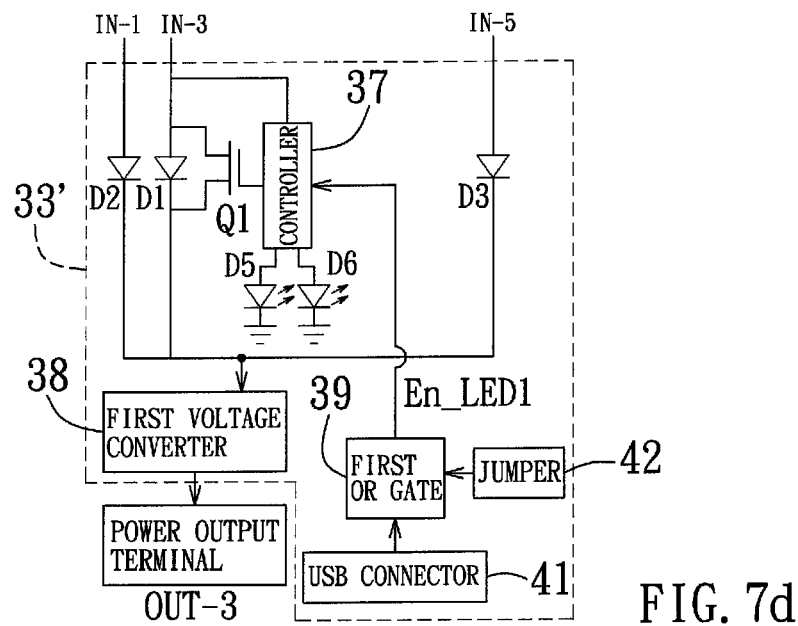
Figure 7E:
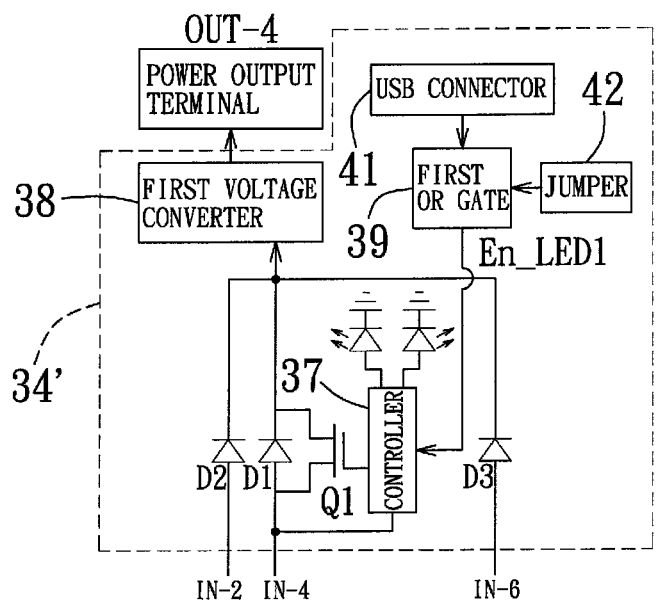
Figure 7F:
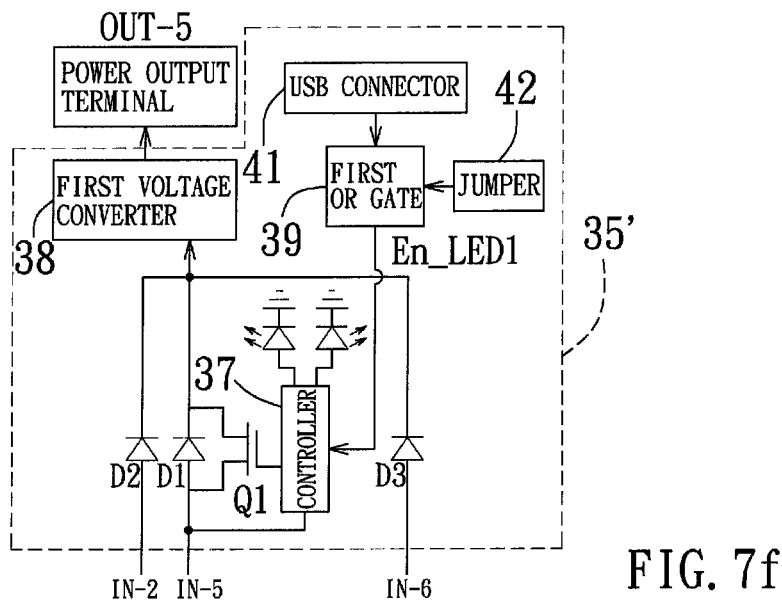
Figure 7G:
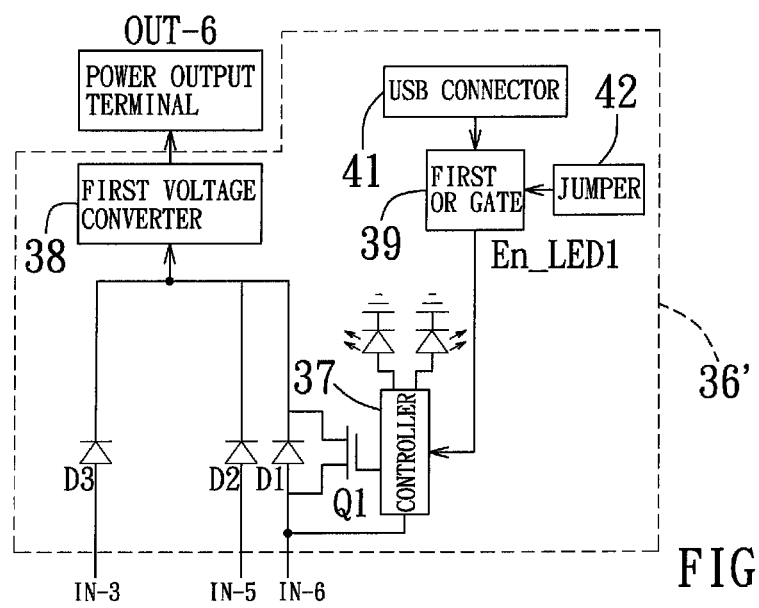

Referring to FIG. 6, the power distribution device 10 further includes a second OR gate 61 electrically coupled to the first OR gates 39 of the power distribution circuits 31~36, a third voltage converter 62 electrically coupled to the second OR gate 61, a number (N, N=6) of third diodes D13~D18 each electrically coupled between a respective one of the power input terminals IN-1~IN-6 and the third voltage converter 62, and two fan connectors 63, 64 each electrically coupled to the third voltage converter 62 for electrical coupling with a heat-dissipating fan (not shown). When at least one of the first OR gates 39 outputs the first signal to the second OR gate 61, this means that at least one of the power output terminals OUT-1~OUT-6 is electrically coupled to the corresponding electronic device. Subsequently, the second OR gate 61 outputs a second signal, such as a high-level signal, to the third voltage converter 62. The third voltage converter 62 responds to the second signal by generating fan voltages, for example, 12V fan voltages for driving the heat-dissipating fans, through converting voltage received at one of the power input terminals IN-1~IN-6 and by outputting the fan voltages to the fan connectors 63, 64, respectively so as to drive rotation of the heat-dissipating fans electrically coupled to the fan connectors 63, 64 for heat dissipation.

In summary, in the aforementioned embodiment, by means of distributing the six power supplies 100, 200, 600 which output power to the power distribution device 10 to the six power output terminals OUT-1~OUT-6 evenly, each of the power output terminals OUT-1~OUT-6 is electrically coupled to a respective one of the power supplies 100, 200, ..., 600 serving as the primary power source, and is electrically coupled to other three of the power supplies 100, 200, ..., 600 serving as the backup power sources. Moreover, by means of the determination made by the controller 37 in each of the power distribution circuits 31~36 as to whether the respective one of the power supplies 100, 200, ..., 600 serving as the primary power source operates normally, said respective one of the power supplies 100, 200, ..., 600 serving as the primary power source provides electricity to the electronic device that is electrically coupled thereto when the result of the determination made by the controller 37 is affirmative. Otherwise, one of the other three of the power supplies 100, 200, ..., 600 serving as the backup power sources provides electricity to the electronic device that is electrically coupled thereto when the result of the determination made by the controller 37 is negative. In this way, by means of providing power to the electronic device in urgent need using idle or extra power of the other power supplies, objects of sharing power resources effectively, raising power usage rate, and that the electronic device electrically coupled to one of the power output terminals OUT-1~OUT-6 may not be interrupted from receiving power are positively achieved.

Referring to FIGS. 7a to 7g, a second embodiment of the power distribution device of the present invention is illustrated. The second embodiment resembles the first embodiment in the configuration that the power distribution device 10' includes a number (M, M=6) of power distribution circuits 31'~36', each electrically coupled to a corresponding one of a number (M, M=6) of power output terminals OUT-1~OUT-6. However, the second embodiment differs from the first embodiment in the configurations that each of the power distribution circuits 31'~36' is electrically coupled to three (i.e., P=3) of the power input terminals IN-1~IN-6. The distribution states thereof are illustrated hereinafter:

The power distribution circuit 31' is electrically coupled to the power input terminals IN-1, IN-3 and IN-4, in which, the power input terminal IN-1 is electrically coupled to the power supply 100 serving as the primary power source and each of the power input terminals IN-3 and IN-4 is electrically coupled to a respective one of the power supplies 300, 400 serving as the backup power sources.

The power distribution circuit 32' is electrically coupled to the power input terminals IN-1, IN-2 and IN-4, in which, the power input terminal IN-2 is electrically coupled to the power supply 200 serving as the primary power source and each of the power input terminals IN-1 and IN-4 is electrically coupled to a respective one of the power supplies 100, 400 serving as the backup power sources.

The power distribution circuit 33' is electrically coupled to the power input terminals IN-1, IN-3 and IN-5, in which, the power input terminal IN-3 is electrically coupled to the power supply 300 serving as the primary power source and each of the power input terminals IN-1 and IN-5 is electrically coupled to a respective one of the power supplies 100, 500 serving as the backup power sources.

The power distribution circuit 34' is electrically coupled to the power input terminals IN-2, IN-4 and IN-6, in which, the power input terminal IN-4 is electrically coupled to the power supply 400 serving as the primary power source and each of the power input terminals IN-2 and IN-6 is electrically coupled to a respective one of the power supplies 200, 600 serving as the backup power sources.

The power distribution circuit 35' is electrically coupled to the power input terminals IN-2, IN-5 and IN-6, in which, the power input terminal IN-5 is electrically coupled to the power supply 500 serving as the primary power source and each of the power input terminals IN-2 and IN-6 is electrically coupled to a respective one of the power supplies 200, 600 serving as the backup power sources.

The power distribution circuit 36' is electrically coupled to the power input terminals IN-3, IN-5 and IN-6, in which, the power input terminal IN-6 is electrically coupled to the power supply 600 serving as the primary power source and each of the power input terminals IN-3 and IN-5 is electrically coupled to a respective one of the power supplies 300, 500 serving as the backup power sources.

Referring to FIGS. 7a to 7g, each of the power distribution circuits 31'~36' includes three of first diodes D1~D3, each electrically coupled between a corresponding one of three of the power input terminals IN-1~IN-6 and the first voltage converter 38. The first diode D1 is electrically coupled to one of the power supplies 100, 200, . . . , 600 serving as the primary power source via a corresponding one of the power input terminals IN-1~IN-6. Each of the power distribution circuits 31'~36' further includes a switch element Q1 connected in parallel to the first diode D1, and a controller 37 for controlling the switch element Q1 to operate in one of a conducting state and a non-conducting state.

In this way, when the controller 37 of each of the power distribution circuits 31'~36' determines that said one of the power supplies 100, 200, . . . , 600 serving as the primary power source operates normally, the switch element Q1 is controlled to operate in the conducting state, such that said one of the power supplies 100, 200, . . . , 600 serving as the primary power source outputs electricity to a corresponding one of the power output terminals OUT-1~OUT-6 coupled thereto via the switch element Q1. Otherwise, the controller 37 controls the switch element Q1 to operate in the non-conducting state such that one of the power supplies 100, 200, . . . , 600 that serve as the backup power sources having more remaining power (i.e., the one having a higher voltage) may provide power to the corresponding one of the power output terminals OUT-1~OUT-6 coupled thereto. By means of providing power to the electronic device in urgent need using idle or extra power of the other power supplies, objects of sharing power resources effectively, raising power usage rate, and that the electronic device electrically coupled to one of the power output terminals OUT-1~OUT-6 may not be interrupted from receiving power are equally achieved.

It is worth mentioning that even though the power distribution device including six power input terminals and six power output terminals is taken as an example of the present invention for illustration, the present invention is not limited to the disclosure herein. That is, the number of the power input terminals and the number of the power output terminals of the power distribution device may not necessarily be the same and the numbers of the power input terminals coupled to each of the power distribution circuits may not necessarily be the same, as long as the power distribution circuit may perform power distribution on the power supplies that are coupled to at least two of the power input terminals that are coupled to the power distribution circuit such that one of the power supplies is configured to serve as the primary power source. Moreover, when the primary power source operates abnormally, the other backup power source may provide surplus electricity to the power output terminal in a timely manner so as to achieve the objects of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power distribution device comprising:
   a number (N) of power output terminals each to be electrically coupled to a corresponding power supply;
   a number (M) of power output terminals each to be electrically coupled to a corresponding electronic device so as to output power thereto; and
   a number (M) of power distribution circuits, each electrically coupled to a corresponding one of said power output terminals and electrically coupled to a number (P) of said power input terminals;
   wherein each of the numbers N, M, and P is independently a positive integer not less than 2;
   wherein each of said power distribution circuits includes:
   a number (P) of first diodes each electrically coupled in a forward-bias arrangement between a respective one of said power input terminals and said corresponding one of said power output terminals;
   a switch element connected in parallel to one of said first diodes and electrically coupled to one of said power input terminals that is electrically coupled to said one of said first diodes; and
   a controller electrically coupled to said switch element and said one of said power input terminals that is electrically coupled to said switch element, said controller controlling said switch element to operate in a conducting state such that said one of said power input terminals that is electrically coupled to said switch element is electrically coupled to said corresponding one of said power output terminals through said switch element when said controller determines that power received at said one of said power input terminals that is electrically coupled to said switch element is normal, said controller controlling said switch element to operate in a non-conducting state when said controller determines that the power received at said one of said power input terminals that is electrically coupled to said switch element is abnormal.

2. The power distribution device as claimed in claim 1, wherein each of said power distribution circuits further includes:
   a first indicator electrically coupled to said controller;
   a second indicator electrically coupled to said controller;
   a first OR gate electrically coupled to said controller;
   a connector electrically coupled to said first OR gate; and
   a jumper electrically coupled to said first OR gate;
   wherein, when said connector is electrically coupled to the corresponding electronic device through said corresponding one of said power output terminals so as to output a signal to said first OR gate of when said jumper is configured to output a signal to said first OR gate, said first OR gate outputs a first signal to said controller, and said controller is responsive to the first signal so as to activate said first indicator when said controller determines that the power received at said one of said power input terminals that is electrically coupled to said switch element is normal, said controller activating said second indicator when said controller determines that the power received at said one of said power input terminals that is electrically coupled to said switch element is abnormal.

3. The power distribution device as claimed in claim 1, wherein at least one of said power distribution circuits further includes a first voltage converter electrically coupled between said first diodes of said power distribution circuit and said corresponding one of said power output terminals for generating a converted voltage by converting voltage received at one of said power input terminals that is electrically coupled to said power distribution circuit and outputting the converted voltage to said corresponding one of said power output terminals.

4. The power distribution device as claimed in claim 1, wherein said switch element is one of a metal-oxide-semiconductor field-effect transistor (MOSFET) and a relay.

5. The power distribution device as claimed in claim 1, wherein the numbers M and N are both equal to 6, and the number P is equal to 3 or 4.

6. The power distribution device as claimed in claim 1, further comprising a second voltage converter, a number (N) of second diodes, a second power output terminal and a setting unit, each of said second diodes being electrically coupled between a respective one of said power input terminals and said second voltage converter, said setting unit being electrically coupled to said second voltage converter and being operable to set an output voltage of said second voltage converter, said second voltage converter generating the output voltage by converting voltage received at one of said power input terminals according to setting of said setting unit and outputting the output voltage to said second power output terminal.

7. The power distribution device as claimed in claim 2, further comprising:
 a second OR gate electrically coupled to said first OR gates of said power distribution circuits;
 a third voltage converter electrically coupled to said second OR gate;
 a number (N) of third diodes each electrically coupled between a respective one of said power input terminals and said third voltage converter; and
 a plurality of fan connectors each electrically coupled to said third voltage converter for electrical coupling with a heat-dissipating fan;
 wherein, when said second OR gate receives the first signal from at least one of said first OR gates, said second OR gate outputs a second signal to said third voltage converter, said second third voltage converter responds to the second signal by generating fan voltages through converting voltage received at one of said power input terminals and by outputting the fan voltages to said fan connectors, respectively.

8. A power distribution circuit to be electrically coupled to a first power supply and a second power supply so as to provide power to an electronic device which is to be electrically coupled to said power distribution circuit, said power distribution circuit comprising:
 a first diode to be electrically coupled in a forward-bias arrangement between the first power supply and the electronic device;
 a second diode to be electrically coupled in a forward-bias arrangement between the second power supply and the electronic device;
 a switch element connected in parallel to said first diode;
 a controller to be electrically coupled to the first power supply and electrically coupled to said switch element, said controller controlling said switch element to operate in a conducting state such that the first power supply is electrically coupled to the electronic device through said switch element when said controller determines that the first power supply operates normally, said controller controlling said switch element to operate in a non-conducting state when said controller determines that the first power supply operates abnormally;
 a first indicator electrically coupled to said controller;
 a second indicator electrically coupled to said controller;
 an OR gate electrically coupled to said controller;
 a connector electrically coupled to said OR gate; and
 a jumper electrically coupled to said OR gate;
 wherein, when the electronic device is electrically coupled to said connector and outputs a signal to said OR gate or when said jumper is configured to output a signal to said OR gate, said OR gate outputs a first signal to said controller, and said controller is responsive to the first signal so as to activate said first indicator when said controller determines that the first power supply operates normally and so as to activate said second indicator when said controller determines that the first power supply operates abnormally.

9. A power distribution circuit to be electrically coupled to a first power supply and a second power supply so as to provide power to an electronic device which is to be electrically coupled to said power distribution circuit, said power distribution circuit comprising:
 a first diode to be electrically coupled in a forward-bias arrangement between the first power supply and the electronic device;
 a second diode to be electrically coupled in a forward-bias arrangement between the second power supply and the electronic device;
 a switch element connected in parallel to said first diode;
 a controller to be electrically coupled to the first power supply and electrically coupled to said switch element, said controller controlling said switch element to operate in a conducting state such that the first power supply is electrically coupled to the electronic device through said switch element when said controller determines that the first power supply operates normally, said controller controlling said switch element to operate in a non-conducting state when said controller determines that the first power supply operates abnormally;
 a first power input terminal to be electrically coupled between the first power supply and said first diode;
 a second power input terminal to be electrically coupled between the second power supply and said second diode; and
 a power output terminal to be electrically coupled between said first and second diodes and the electronic device.

10. The power distribution circuit as claimed in claim 8, wherein said switch element is one of a metal-oxide-semiconductor field-effect transistor (MOSFET) and a relay.

* * * * *